United States Patent
Cieslak et al.

(10) Patent No.: US 7,395,348 B1
(45) Date of Patent: Jul. 1, 2008

(54) NETWORK CACHE-BASED CONTENT ROUTING

(75) Inventors: Martin Cieslak, Fremont, CA (US);
James Aviani, Santa Barbara, CA (US);
Martin Kagan, Burlingame, CA (US)

(73) Assignee: Cisco Technology, Inc., San Jose, CA (US)

( * ) Notice: Subject to any disclaimer, the term of this patent is extended or adjusted under 35 U.S.C. 154(b) by 1168 days.

(21) Appl. No.: 09/588,027

(22) Filed: Jun. 5, 2000

(51) Int. Cl.
*G06F 15/173* (2006.01)
*G06F 15/16* (2006.01)

(52) U.S. Cl. ..................... 709/238; 709/232

(58) Field of Classification Search .......... 709/203, 709/204, 206, 207, 217, 223, 232, 234, 235, 709/238, 245; 370/392
See application file for complete search history.

(56) References Cited

U.S. PATENT DOCUMENTS

| | | | |
|---|---|---|---|
| 4,827,411 A | 5/1989 | Arrowood et al. |
| 4,965,772 A | 10/1990 | Daniel et al. |
| 5,414,704 A | 5/1995 | Spinney |
| 5,452,447 A | 9/1995 | Nelson et al. |
| 5,488,412 A | 1/1996 | Majeti et al. |
| 5,506,987 A | 4/1996 | Abramson et al. |
| 5,511,208 A | 4/1996 | Boyles et al. |
| 5,555,244 A | 9/1996 | Gupta et al. |
| 5,586,121 A | 12/1996 | Moura et al. |
| 5,611,049 A | 3/1997 | Pitts |
| 5,673,265 A | 9/1997 | Gupta et al. |
| RE35,774 E | 4/1998 | Moura et al. |
| 5,751,971 A | 5/1998 | Dobbins et al. |
| 5,774,660 A | 6/1998 | Brendel et al. |
| 5,787,470 A | 7/1998 | DeSimone et al. |
| 5,818,845 A | 10/1998 | Moura et al. |
| 5,828,655 A | 10/1998 | Moura et al. |
| 5,848,241 A | 12/1998 | Misinai et al. |
| 5,852,717 A | 12/1998 | Bhide et al. |
| 5,859,852 A | 1/1999 | Moura et al. |
| 5,872,773 A | 2/1999 | Katzela et al. |
| 5,892,903 A | 4/1999 | Klaus |
| 5,946,047 A | 8/1999 | Levan |
| 5,946,048 A | 8/1999 | Levan |
| 5,950,205 A | 9/1999 | Aviani, Jr. |
| 5,953,335 A | 9/1999 | Erimli et al. |
| 5,956,346 A | 9/1999 | Levan |

(Continued)

FOREIGN PATENT DOCUMENTS

WO   WO98/31107   7/1998

OTHER PUBLICATIONS

Eager et al., "Adaptive Load Sharing in Homogeneous Distributed Systems," IEEE, Transactions on Software Engineering, vol. Se.-12, No. 5, May 1986, pp. 662-675.

(Continued)

*Primary Examiner*—Paul H. Kang
(74) *Attorney, Agent, or Firm*—Beyer Weaver LLP

(57) ABSTRACT

Methods and apparatus are described for routing data traffic in a network having a plurality of layers including physical, data link, and network layers. The data traffic is received and one of a plurality of routing options for the data traffic is selected with reference to information outside of the physical, data link, and network layers. The data traffic is then routed according to the selected routing option.

37 Claims, 4 Drawing Sheets

U.S. PATENT DOCUMENTS

| | | | |
|---|---|---|---|
| 5,959,660 | A | 9/1999 | Levan |
| 5,959,968 | A | 9/1999 | Chin et al. |
| 5,959,997 | A | 9/1999 | Moura et al. |
| 5,989,060 | A | 11/1999 | Coile et al. |
| 6,006,264 | A | 12/1999 | Colby et al. |
| 6,006,266 | A | 12/1999 | Murphy et al. |
| 6,016,388 | A | 1/2000 | Dillon |
| 6,052,718 | A | 4/2000 | Gifford |
| 6,205,481 | B1 * | 3/2001 | Heddaya et al. ............ 709/226 |
| 6,317,778 | B1 * | 11/2001 | Dias et al. ................... 709/214 |
| 6,343,313 | B1 * | 1/2002 | Salesky et al. .............. 709/204 |
| 6,345,294 | B1 | 2/2002 | O'Toole et al. |
| 6,347,087 | B1 * | 2/2002 | Ganesh et al. .............. 370/392 |
| 6,385,615 | B1 * | 5/2002 | Haeri et al. ................. 709/238 |
| 6,604,241 | B1 * | 8/2003 | Haeri et al. ................. 709/217 |
| 6,742,044 | B1 * | 5/2004 | Aviani et al. ................ 709/235 |
| 2005/0021857 | A1 * | 1/2005 | Balassanian ............... 709/245 |

OTHER PUBLICATIONS

Akamai Technologies, Inc.—Global Internet Content Delivery—"How FreeFlow Works," webmaster@akamai.com 1999-2000.

Internap, "Preferred Collocation Services," http://www.internap.com Copyright © 2001 Internap Network Services Corporation.

Hank, et al., Request For Comments No. 1701, entitled, "Generic Routing Encapsulation (GRE)," Jan. 2000, Internet Engineering Task Force, 7 pages.

Mockapetris, P., Request For Comments No. 1034, entitled, "Domain Names—Concepts and Facilities," Nov. 1987, Internet Engineering Task Force, 48 pages.

Information Sciences Institute, Request for Comments No. 793, entitled, "Transmission Control Protocol—DARPA Internet Program—Protocol Specification," Sep. 1981, Internet Engineering Task Force, 49 pages.

David M. Gifford, "Replica Routing,"U.S. Appl. No. 09/472,964, filed Dec. 28, 1999, 37 Pages.

Johnson et al., "Dynamic Server Organization," U.S. Appl. No. 09/294,837, filed Apr. 19, 1999, 42 Pages.

Lu et al., "Automatic Network Addresses Assignment and Translation Interference," U.S. Appl. No. 60/160,535, filed Oct. 20, 1999, 127 Pages.

Lu et al., "Method and Apparatus for Automatic Network Address Assignment," U.S. Appl. No. 60/178,063, filed Jan. 24, 2000, 74 Pages.

Johnson et al., "Method and Apparatus for Determining a Network Topology in the Presence of Network Address Translation," U.S. Appl. No. 60/178,062, filed Jan. 24, 2000, 32 pages.

Toole et al., "Fast-Changing Network Status and Load Monitoring and Feedback," U.S. Appl. No. 60/177,985, filed Jan. 25, 2000, 20 Pages.

Kirk Johnson, "A Method and Apparatus for Minimalist Approach to Implementing Server Selection," U.S. Appl. No. 60/177,415, filed Jan. 21, 2000, 39 Pages.

Aviani et al., *Wide Area Load Balancing Of Web Traffic*, filed Jun. 28, 2000, U.S. Appl. No. 09/606,418.

Gourlay et al., *Path Selection System*, filed Dec. 19, 2001, U.S. Appl. No. 10/034,068.

Gifford et al., *Replica Routing*, filed Jan. 7, 1997, U.S. Appl. No. 08/779,770.

Aviani et al., *Distributed Network Traffic Load Balancing Technique Implemented Without Gateway Router*, filed May 10, 2000, U.S. Appl. No. 09/569,090.

Gourlay et al., *Phased Learning Approach To Determining Closet Content Serving Sites*, filed Aug. 31, 2000, U.S. Appl. No. 09/652,766.

Valloppillil, Vinod, "*Cache Array Routing Protocol v1.0*," Oct. 20, 1997, Internet-Draft, http://ds1.internic/net/internet-drafts/draft-vinod-carp-v1-02.txt, pp. 1-6.

Cisco Technology, Inc., "*Configuring IP Routing Protocols*," Dec. 10, 1997, http://www.cisco.com/univercd/data/doc/software/11_2/cnpl/5ciprout.htm#REF40277, pp. 1-6, 120-122.

Ousterhout, John K., "*A Trace-Driven Analysis of the UNIX 4.2 BSD File System*," Jan. 2, 1993, *Computer-Science Division, Electrical Engineering and Computer Science*, University of California, Berkeley, CA, pp. 1-12.

Welch, Brent, "*A Comparison of the Vnode and Sprite File System Architectures*," *Proceedings of the File System Workshop*, May 1992, pp. 29-44.

Ousterhout, John K., "*Beating the I/O Bottleneck: A Case for Log-Structured File Systems*," Jan. 30, 1992, *Computer Science Division, Electrical Engineering anc Computer Sciences*, University of California, Berkeley, CA, pp. 1-17.

Martin Arlitt, Ludmila Cherkasova, John Dilley, Rich Friedrich and Tai Jin, of Hewlett-Packard Laboratories, "*Evaluating Content Management Techniques for Web Proxy Caches*," Apr. 30, 1999, 9 pages.

* cited by examiner

NETWORK CACHE-BASED CONTENT ROUTING

BACKGROUND OF THE INVENTION

The present invention relates to transmission of data in a network environment. More specifically, the present invention relates to methods and apparatus for improving the efficiency with which data are transmitted over the Internet. Still more specifically, the present invention provides techniques by which routing decisions for particular data packets are made with reference to the nature of the data being transmitted, e.g., content routing.

Generally speaking, when a client platform communicates with some remote server, whether via the Internet or an intranet, it crafts a data packet which defines a TCP connection between the two hosts, i.e., the client platform and the destination server. More specifically, the data packet has headers which include the destination IP address, the destination port, the source IP address, the source port, and the protocol type. The destination IP address might be the address of a well known World Wide Web (WWW) search engine such as, for example, Yahoo, in which case, the protocol would be TCP and the destination port would be port 80, a well known port for http and the WWW. The source IP address would, of course, be the IP address for the client platform and the source port would be one of the TCP ports selected by the client. These five pieces of information define the TCP connection.

Given the increase of traffic on the World Wide Web and the growing bandwidth demands of ever more sophisticated multimedia content, there has been constant pressure to find more efficient ways to service data requests than opening direct TCP connections between a requesting client and the primary repository for the desired data. Interestingly, one technique for increasing the efficiency with which data requests are serviced came about as the result of the development of network firewalls in response to security concerns. In the early development of such security measures, proxy servers were employed as firewalls to protect networks and their client machines from corruption by undesirable content and unauthorized access from the outside world. Proxy servers were originally based on Unix machines because that was the prevalent technology at the time. This model was generalized with the advent of SOCKS which was essentially a daemon on a Unix machine. Software on a client platform on the network protected by the firewall was specially configured to communicate with the resident demon which then made the connection to a destination platform at the client's request. The demon then passed information back and forth between the client and destination platforms acting as an intermediary or "proxy."

Not only did this model provide the desired protection for the client's network, it gave the entire network the IP address of the proxy server, therefore simplifying the problem of addressing of data packets to an increasing number of users. Moreover, because of the storage capability of the proxy server, information retrieved from remote servers could be stored rather than simply passed through to the requesting platform. This storage capability was quickly recognized as a means by which access to the World Wide Web could be accelerated. That is, by storing frequently requested data, subsequent requests for the same data could be serviced without having to retrieve the requested data from its original remote source. Currently, most Internet service providers (ISPs) accelerate access to their web sites using proxy servers.

Unfortunately, interaction with such proxy servers is not transparent, requiring each end user to select the appropriate proxy configuration in his or her browser to allow the browser to communicate with the proxy server. For the large ISPs with millions of customers there is significant overhead associated with handling tech support calls from customers who have no idea what a proxy configuration is. Additional overhead is associated with the fact that different proxy configurations must be provided for different customer operating systems. The considerable economic expense represented by this overhead offsets the benefits derived from providing accelerated access to the World Wide Web. Another problem arises as the number of WWW users increases. That is, as the number of customers for each ISP increases, the number of proxy servers required to service the growing customer base also increases. This, in turn, presents the problem of allocating packet traffic among multiple proxy servers.

Another technique for increasing the efficiency with which data requests are serviced is described in commonly assigned, copending U.S. patent application Ser. No. 08/946,867 for METHOD AND APPARATUS FOR FACILITATING NETWORK DATA TRANSMISSIONS filed Oct. 8, 1997, the entirety of which is incorporated herein by reference for all purposes. The invention described in that copending application represents an improvement over the proxy server model which is transparent to end users, high performance, and fault tolerant. By altering the operating system code of an existing router, the router is enabled to redirect data traffic of a particular protocol intended for a specified port, e.g., TCP with port 80, to one or more caching engines connected to the router via an interface having sufficient bandwidth such as, for example, a 100baseT interface. If there are multiple caching engines connected to the cache-enabled router, the router selects from among the available caching engines for a particular request based on a simple algorithm according to which a particular group of addresses is associated with each caching engine.

The caching engine to which the request is re-routed "spoofs" the requested destination platform and accepts the request on its behalf via a standard TCP connection established by the cache-enable router. If the requested information is already stored in the caching engine, i.e., a cache "hit" occurs, it is transmitted to the requesting platform with a header indicating its source as the destination platform. If the requested information is not in the caching engine, i.e., a cache "miss" occurs, the caching engine opens a direct TCP connection with the destination platform, downloads the information, stores it for future use, and transmits it to the requesting platform. All of this is transparent to the user at the requesting platform which operates exactly as if it were communicating with the destination platform. Thus, the need for configuring the requesting platform to suit a particular proxy configuration is eliminated along with the associated overhead. Moreover, traffic may be easily allocated among as many caching engines as become necessary. Thus, content caching provides a way to compensate for the bandwidth limitations discussed above.

Another specific embodiment of a packet redirection protocol which may be used to implement such a network caching technique is described in copending, commonly assigned, U.S. Provisional Patent Application No. 60/168,862 for METHOD AND APPARATUS FOR REDIRECTING NETWORK TRAFFIC filed Dec. 2, 1999, the entirety of which is incorporated herein by reference for all purposes. According to a specific embodiment described in that application, the network caches have the capability of determining that particular redirected packets should be transmitted back to the redirecting router and reinserted into the original traffic flow. This may be done in a manner transparent to the source or destination of the packets. An example of a case in which packets would need to be reinserted in the original flow might be where the cache recognizes the source and destination pairs identified by the packets as corresponding to a connection requiring IP-based authentication. Another example would be where the cache is overloaded and is currently unable to handle all of the redirected traffic.

A technique conceptually related to content caching referred to as content co-location has also been developed to provide faster access to certain types of data. That is, a large amount of Internet content resides on machines in the U.S. Client machines in remote geographic locations such as New Zealand or Australia typically have two ways of retrieving such content, i.e., via terrestrial links (bidirectional and fast, but expensive) and satellite links (mostly unidirectional and relatively cheap, but slow).

Content co-location provides one way to facilitate faster access to such content for geographically remote users. According to this technique, servers are provided in the geographically remote areas which store at least some of the content of the original site, e.g., image files. Akamai and Sandpiper provide such "co-loc" facilities to content providers. When a client requests a page containing such objects, the html refers to the objects by object names which correspond to the co-loc provider. These object names are then resolved by the client's browser to an IP address corresponding to the closest co-loc facility.

While content co-location techniques have proven to be relatively effective, content providers pay a huge premium for this service. In addition, implementation of content co-location requires some relatively complex and computationally intense protocols. For example, coherency must be maintained between content at co-loc facilities and the content at the original site. In addition, browsers must constantly perform the object name resolution when parsing ordinary html to access the correct co-location facility.

Another limitation associated with various network devices, e.g., routers, switches, gateways, and some caches, is that routing decisions are made only with reference to the lower level network layers, i.e., the physical, data link, and network layers. FIG. 1 illustrates the relationship of one such network device, i.e., a gateway, to the various network layers. Assume that the user application layer protocol 102A in host A sends an application protocol data unit (PDU) to an application layer protocol 102B in host B, such as, for example, a file transfer system. The file transfer software performs a variety of functions and sends file records to the user. In many systems, the operations at host B are known as server operations and the operations at host A are know as client operations.

As indicated by the downward arrows in the protocol stack at host A, this unit is passed to the transport layer protocol 104A, which performs a variety of operations and adds a header to the PDU passed to it. At this point, the unit of data is often referred to as a segment. The PDU from the upper layers is considered to be data to the transport layer.

Next, the transport layer passes the segment to the network layer 106A, also called the IP layer, which again performs specific services and appends a header. This unit (now called a datagram in internet terms) is passed down to the lower layers. Here, the data link layer adds its header as well as a trailer, and the data unit (now called a frame) is launched into subnetwork 110 by the physical layer 108A. Of course, if host B sends data to host A, the process is reversed and the direction of the arrows is changed.

Internet protocols are typically unaware of what goes on inside the network. The network manager is free to manipulate and manage the PDU in any manner necessary. In some instances, however, the internet PDU (data and headers) remains unchanged as it is transmitted through the subnet. In FIG. 1, it emerges at the gateway where it is processed through the lower layers 114 and passed to the IP (network) layer 112. Here, routing decisions are made based only on the destination address provided by the host computer. After these routing decisions have been made, the PDU is passed to the communications link connected to the appropriate subnetwork (comprising the lower layers). The PDU is re-encapsulated into the data link layer frame and passed to the next subnetwork 116, where it finally arrives at the destination host.

One of the limitations inherent in the traffic routing approach described above is that the routing decisions are made with reference only to information in the lower network layers. Because data transmissions in these layers are virtually indistinguishable from one another it is difficult if not impossible to make intelligent routing decisions based on the type of data being transmitted or requested, or any other high level information. As a result, opportunities for improving the efficiency with which networks operate are lost.

In view of the foregoing, there is a need for techniques by which network devices can make intelligent routing decisions about specific types of data traffic which are less expensive in terms of network resources than currently available solutions.

SUMMARY OF THE INVENTION

According to the present invention, network devices are enabled to make intelligent routing decisions based upon any of a number of parameters or characteristics associated with specific data traffic. According to a specific embodiment of the invention, the parameters or characteristics of interest are associated with the application layer. According to another specific embodiment, the parameters or characteristics of interest relate to information which is specific to a network cache making the routing decisions.

Thus, the present invention provides a computer-implemented method for routing data traffic in a network having a plurality of layers including physical, data link, and network layers. The data traffic is received and one of a plurality of routing options for the data traffic is selected with reference to information outside of the physical, data link, and network layers. The data traffic is then routed according to the selected routing option.

According to one embodiment, the data traffic is received and one of a plurality of routing options for the data traffic is selected with reference to information associated with the network's application layer. In another embodiment where the data traffic has been redirected to a network cache, the data traffic are received by the network cache which selects one of a plurality of routing options for the data traffic with reference to information about the data traffic accessible by the network cache.

A further understanding of the nature and advantages of the present invention may be realized by reference to the remaining portions of the specification and the drawings.

DETAILED DESCRIPTION OF SPECIFIC EMBODIMENTS

Figure 1:
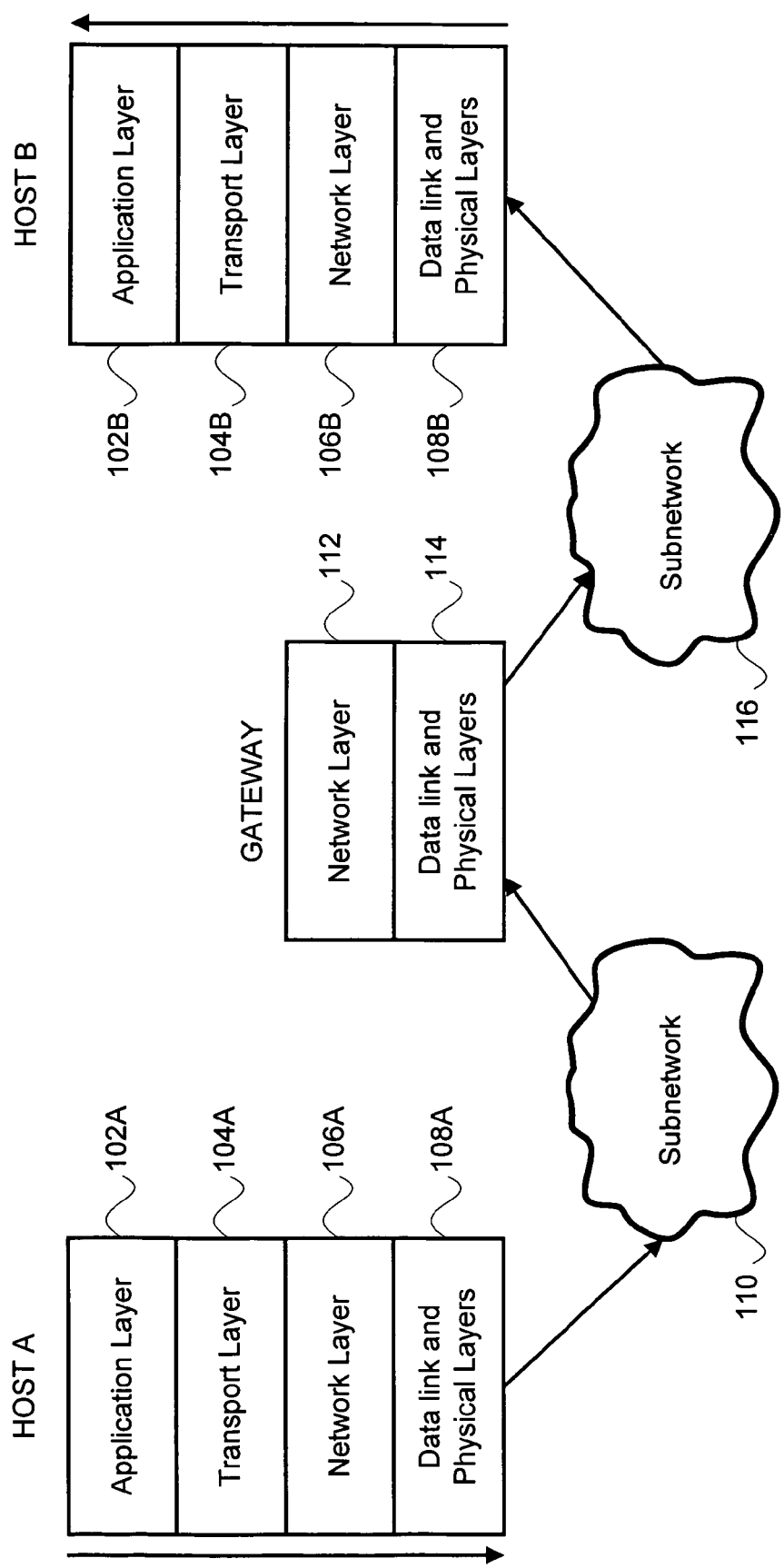
FIG. 1 is a block diagram illustrating conventional data transmissions in a wide area network.
Figure 2:
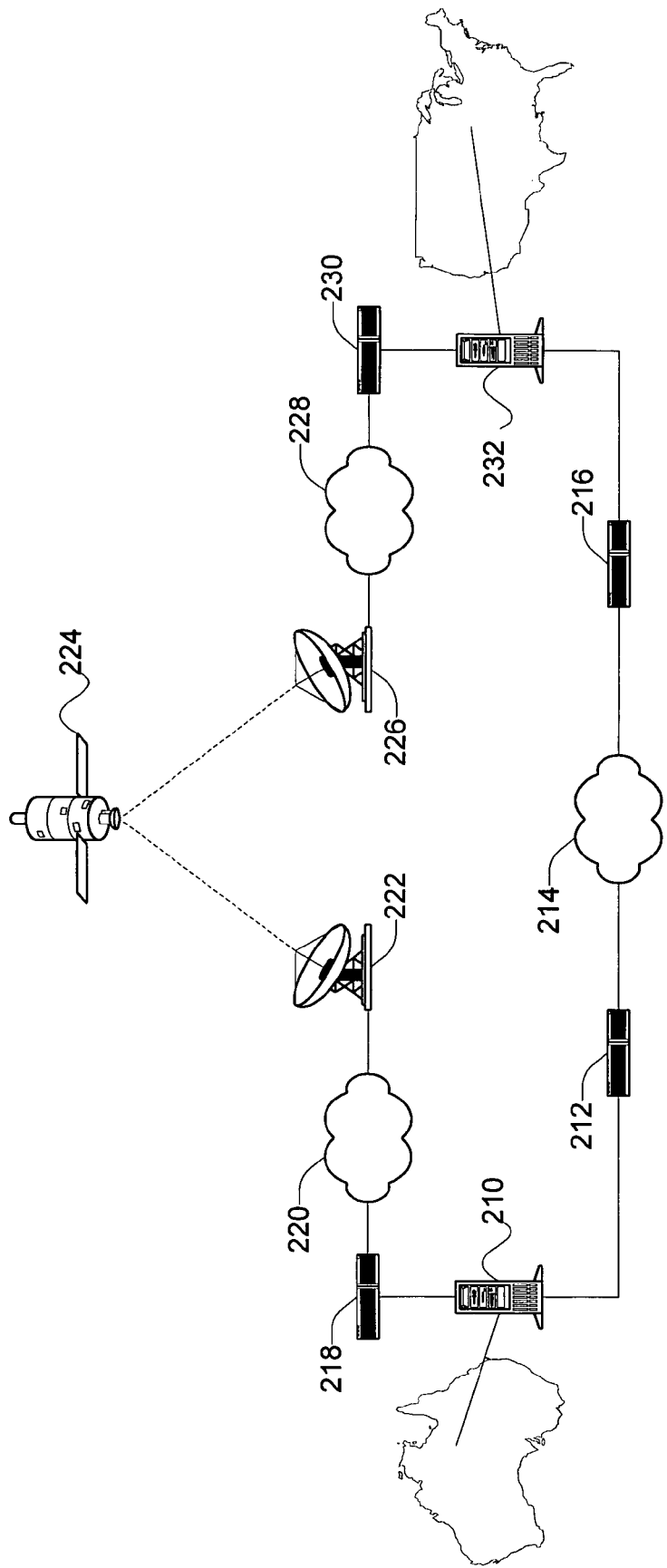
FIG. 2 is a block diagram of a network environment in which specific embodiments of the present invention may be implemented.

FIG. 2 is a block diagram of a network environment in which specific embodiments of the present invention may be implemented. According to a first specific embodiment, a request for content in the United States is received by a network cache 210 in Australia. Based on information associated with the application layer, cache 210 decides whether to use a terrestrial link or a satellite link to route the request. The selected link will thus determine the routing path for the response to the request. According to one embodiment, the determination is made by parsing the request in the application layer and then selecting a socket option for the outgoing request accordingly. In the figure, the terrestrial link is shown comprising router 212, a wide area network 214 of arbitrary size, and router 216. The satellite link is shown comprising router 218, wide area network 220, satellite link 222, satellite 224, satellite link 226, wide area network 228, and router 230. Each of the links is shown connecting with a cache 232 although this is not necessary for implementation of this embodiment. That is, the links may connect directly with the destination machine or an associated router.

According to a more specific embodiment, the decision between the terrestrial and satellite links is based on information which correlates to the relative sizes of the objects being requested. That is, html objects are typically fairly small as compared to graphically intense embedded objects. In addition, html objects typically anchor or form the foundation for web pages. When a user is downloading such a page, they will tolerate a slower download of the graphics, but they need the page's foundation, i.e., the html, right away. Therefore, according to this embodiment, the html is requested via the fast terrestrial link and the embedded graphics via the slower satellite link. According to a still more specific embodiment, the type of object is determined (i.e., the routing decision is made) with reference to the suffix of the URL (e.g., *.htm vs. *.gif).

The embodiments described above use the satellite uplink to request the larger objects. That is, because the decision making is performed on the side of the links which is remote from the requested content, satellite link 222 must be used to both transmit the request and receive the requested data. Because providing this uplink capability at satellite link 222 can be expensive, a second embodiment is provided in which cache 232 on the content side of the links makes the decisions. That is, when cache 232 receives data traffic, it routes the traffic using, for example, the criteria described above with reference to cache 210. The difference is that, because cache 232 is on the content side of the links, no satellite uplink needs to be provided. Thus, for example, as with the embodiment described above, because of the application layer characteristics of data traffic received by cache 232, large objects (e.g., *.gif objects) may be sent via the satellite link while small objects (*.htm objects) may be sent via the terrestrial link.

It will be understood that the network configurations and links shown in FIG. 2 are merely used for illustration purposes and that a wide variety of configurations may be employed without departing from the scope of the invention. In addition, the routing decisions enabled by the present invention are not limited to a choice between a terrestrial link and a satellite link, or based only on application layer information as described above. Rather, the present invention enables intelligent selection from among a plurality of routing options based on any combination of information associated with the application layer and any of the other network layers. Put another way, based upon the request, the cheapest of a plurality of links is selected for transmitting the request and thus the object. The determination of what is cheapest is a multi-parameter determination which looks at, for example, speed, economic cost, specific user's need/level of access, remote ISP use agreements (e.g., many people overseas have multiple ISPs for which the cost of use increases dramatically at certain levels thereby making it reasonable to switch over to another ISP), etc. Effectively, the present invention enables so called content routing, i.e., the notion that objects are routed based on the type of content requested.

The information upon which the routing determination is based may vary widely. That is, network caches designed according to the present invention may incorporate routing rules based on any information associated with the higher network layers. For example, a request or a requested object may be routed according to whether the requested content is cacheable or uncacheable, ascii or binary, HTTP or ICP, regular requests or forced reloads, static web page requests or browser-based applications. For example, an object may be determined to be cacheable by looking at the HTTP headers or URL suffixes. In addition, whether an object is ascii or binary may be determined with reference to specific file suffixes, e.g., .htm vs. .gif or .jpg. An object can be differentiated as HTTP or ICP with reference to the transmission protocol used (i.e., TCP vs. UDP) or the port. A regular request may be distinguished from a forced reload with reference to the appropriate HTTP header.

Figure 3:
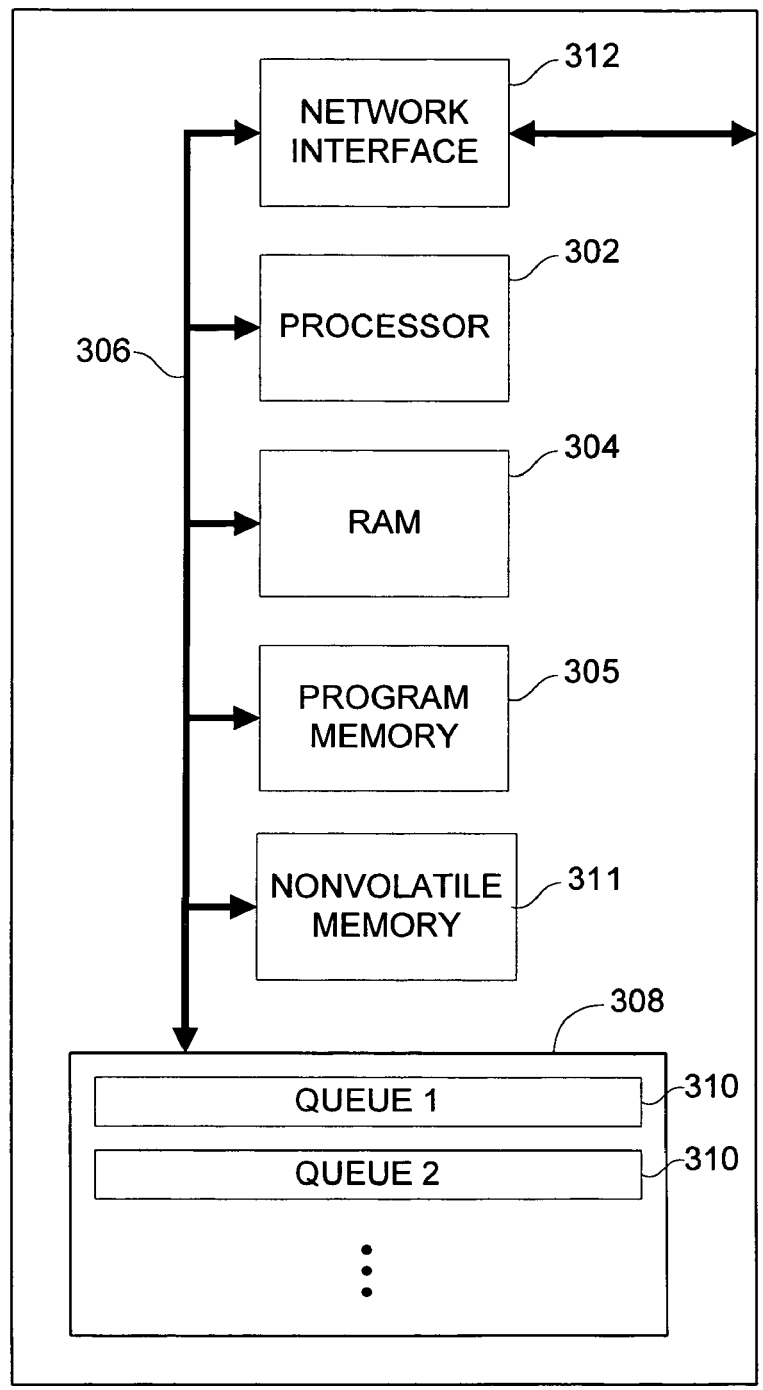
FIG. 3 is a block diagram of a network cache for use with specific embodiments of the present invention.

FIG. 3 is a block diagram of a network cache such as, for example, cache 210 or cache 232 of FIG. 2. A central processor 302 controls operation of cache 210/232 and its various subsystems using system memory 304 and bus 306. Data objects are stored in cache memory 308 which, in a specific embodiment, comprises multiple queues of volatile RAM 310. According to various embodiments, memory 308 may comprise one or more nonvolatile disk drives. According to yet other embodiments, memory 308 may comprise any combination of volatile and nonvolatile memory. According to a specific embodiment, a nonvolatile disk drive 311 is provided as additional storage for cached objects.

A network interface 312 enables communication with external devices. Portions of memory 310 may also be employed for other purposes such as, for example, storing software code for directing the operation of various functionalities of cache 210/232. Alternatively, program instructions for execution by processor 302 directing operation of the functionalities of cache 210/232 may be stored in a separate program memory 305. It will be understood that the cache architecture shown in FIG. 3 is merely illustrative and should not be construed to limit the scope of the present invention. That is, any of a wide variety of cache architectures may be employed to implement the present invention.

Network caches are in a unique position to have certain information about specific data traffic which is unavailable to other network devices. Some of this information is useful with regard to making intelligent routing decisions for the associated traffic. According to a specific embodiment of the present invention, when a network cache receives a redirected request for an object from a cache-enabled router, the cache identifies the redirecting router from the encapsulation header and, if the cache needs to issue its own request for that object, it can route the new request through the redirecting router to avoid disruption of an independent load balancing scheme.

This is important in caching systems in which multiple routers are logically connected to multiple caches.

Figure 4:
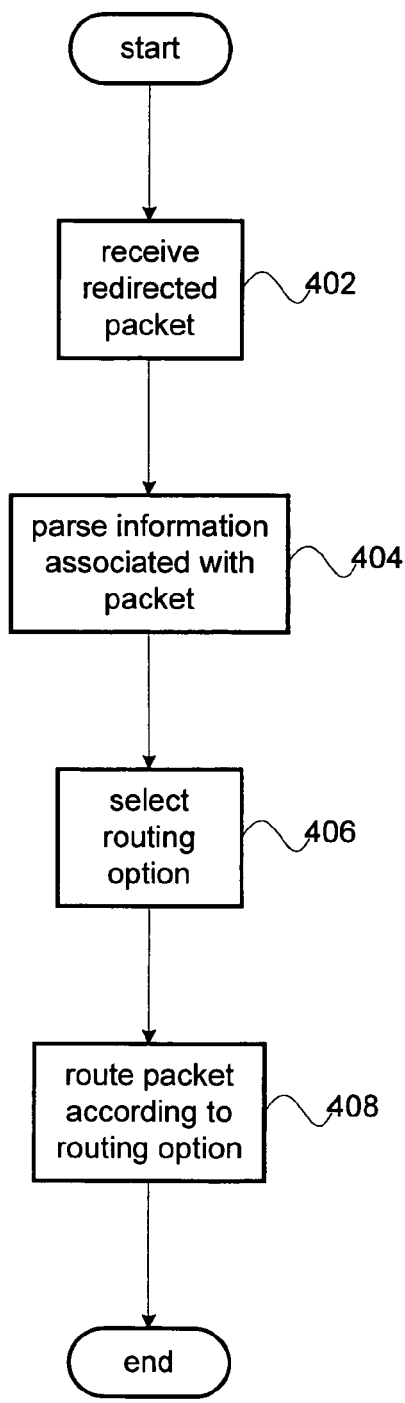
FIG. 4 is a flowchart illustrating the caching of objects according to a specific embodiment of the present invention.

FIG. 4 is a flowchart illustrating the routing of data traffic according to a specific embodiment of the present invention. When a packet is redirected to a cache designed according to the present invention (402), information associated with the packet is parsed (404) to determine which of a plurality of routing options are to be selected (406). The packet is then routed according to the selected routing option (408). According to a specific embodiment and as described above, the information associated with the packet is application layer information. According to yet other embodiments, cache specific information associated with particular data traffic is parsed for the routing determination.

While the invention has been particularly shown and described with reference to specific embodiments thereof, it will be understood by those skilled in the art that changes in the form and details of the disclosed embodiments may be made without departing from the spirit or scope of the invention. Therefore, the scope of the invention should be determined with reference to the appended claims.

What is claimed is:

1. A computer-implemented method for routing data traffic in a network having a plurality of network layers including an application layer, the method comprising:
   receiving the data traffic at a network cache;
   determining, at the network cache, a destination network device to which to forward the data traffic;
   selecting, at the network cache, one of a plurality of routing options for the data traffic with reference to information in the application layer; and
   routing the data traffic according to the selected routing option, wherein the routing includes forwarding the data traffic from the network cache to the destination network device.

2. The method of claim 1 wherein the data traffic has been redirected from an original destination according to a caching protocol.

3. The method of claim 1 wherein the data traffic comprises a request from a source platform to a destination platform.

4. The method of claim 3, wherein the information correlates to a relative size of an object that the request seeks.

5. The method of claim 1 wherein the data traffic comprises a response to a request, the request being from a source platform to a destination platform.

6. The method of claim 1 further comprising parsing the information in the application layer.

7. The method of claim 6 wherein the information comprises a URL associated with the data traffic.

8. The method of claim 7 wherein the information comprises a suffix associated with the URL.

9. The method of claim 8 wherein parsing the information comprises determining whether the suffix associated with the URL indicates one of a plurality of MIME types.

10. The method of claim 9 wherein the plurality of MIME types comprises *.gif, *.jpg, *.pdf, *.mpX, and *.htm.

11. The method of claim 6 wherein parsing the information comprises determining whether the data traffic relates to ascii or binary data objects.

12. The method of claim 1 wherein selecting one of the plurality of options comprises setting one of a plurality of socket options for the data traffic.

13. The method of claim 12 wherein the plurality of socket options include a first link and a second link, the first link socket option being selected for a first type of data traffic and the second link socket option being selected for a second type of data traffic.

14. The method of claim 13 wherein the first and second links comprise land and satellite links, respectively.

15. The method of claim 13 wherein the first and second types of data comprise ascii and binary data, respectively.

16. A computer program product comprising a computer readable medium having computer program instructions stored therein for implementing the method of claim 1.

17. The method of claim 1, wherein selecting one of the plurality of routing options for the data traffic is based on relative network resource expenses of data traffic types.

18. The method of claim 1, further comprising determining an endpoint for the data traffic using information contained in the network layer of the data traffic.

19. The method of claim 18, wherein the routing options indicate potential routing paths from the network cache to the endpoint.

20. A computer-implemented method for routing data traffic in a network which has been redirected to a network cache, the method comprising:
   receiving the data traffic with the network cache;
   determining, at the network cache, a destination network device to which to forward the data traffic;
   selecting, at the network cache, one of a plurality of routing options for the data traffic with reference to information in the application layer; and
   routing the data traffic according to the selected routing option, wherein the routing includes forwarding the data traffic from the network cache to the destination network device.

21. The method of claim 20 wherein the information relates to whether a data object associated with the data traffic is cacheable.

22. The method of claim 20 wherein the information relates to whether the data traffic comprises a forced reload.

23. A computer program product comprising a computer readable medium having computer program instructions stored therein for implementing the method of claim 20.

24. The method of claim 20, further comprising determining an endpoint for the data traffic using information contained in the network layer of the data traffic.

25. The method of claim 24, wherein the routing options indicate potential routing paths from the network cache to the endpoint.

26. A computer-implemented method for routing data traffic in a network having a plurality of layers including physical, data link, and network layers, the method comprising:
   receiving the data traffic at a network cache;
   determining, at the network cache, a destination network device to which to forward the data traffic;
   selecting, at the network cache, one of a plurality of routing options for the data traffic with reference to a type of information outside of the physical, data link, and network layers; and
   routing the data traffic according to the selected routing option, wherein the routing includes forwarding the data traffic from the network cache to the destination network device.

27. The method of claim 26, further comprising determining an endpoint for the data traffic using information contained in the network layer of the data traffic.

28. The method of claim 27, wherein the routing options indicate potential routing paths from the network cache to the endpoint.

29. A network cache for operating in a network having a plurality of layers including an application layer, comprising:
   cache memory for storing a plurality of objects; and
   an operating system which is operable to:

receive redirected data traffic;

determine, at the network cache, a destination network device to which to forward the data traffic;

select, at the network cache, one of a plurality of routing options for the data traffic with reference to information in the application layer; and route the data traffic according to the selected routing option, wherein the routing includes forwarding the data traffic from the network cache to the destination network device.

30. The network cache of claim 29, wherein the operating system is further operable to determine an endpoint for the data traffic using information contained in the network layer of the data traffic.

31. The network cache of claim 30, wherein the routing options indicate potential routing paths from the network cache to the endpoint.

32. A network cache, comprising:

cache memory for storing a plurality of objects; and a processor which is operable to:

receiving redirected data traffic;

determine, at the network cache, a destination network device to which to forward the data traffic;

select, at the network cache, one of a plurality of routing options for the data traffic with reference to information in the application layer about the data traffic accessible by the network cache; and route the data traffic according to the selected routing option, wherein the routing includes forwarding the data traffic from the network cache to the destination network device.

33. The network cache of claim 32, wherein the processor is further operable to determine an endpoint for the data traffic using information contained in the network layer of the data traffic.

34. The network cache of claim 33, wherein the routing options indicate potential routing paths from the network cache to the endpoint.

35. A network cache for operating in a network having a plurality of layers including physical, data link, and network layers, comprising:

cache memory for storing a plurality of objects; and an operating system which is operable to:

receive redirected data traffic;

determine, at the network cache, a destination network device to which to forward the data traffic;

select, at the network cache, one of a plurality of routing options for the data traffic with reference to a type of information outside of the physical, data link, and network layers; and route the data traffic according to the selected routing option, wherein the routing includes forwarding the data traffic from the network cache to the destination network device.

36. The network cache of claim 35, wherein the operating system is further configured to determine an endpoint for the data traffic using information contained in the network layer of the data traffic.

37. The network cache of claim 36, wherein the routing options indicate potential routing paths from the network cache to the endpoint.

* * * * *